(12) United States Patent
Mir Ghaderi et al.

(10) Patent No.: US 9,066,249 B2
(45) Date of Patent: Jun. 23, 2015

(54) METHODS AND APPARATUS FOR INTERFERENCE COORDINATED TRANSMISSION AND RECEPTION IN WIRELESS NETWORKS

(71) Applicant: Apple Inc., Cupertino, CA (US)

(72) Inventors: Seyed Reza Mir Ghaderi, Sunnyvale, CA (US); Kee-Bong Song, Cupertino, CA (US); Syed A. Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 13/787,684

(22) Filed: Mar. 6, 2013

(65) Prior Publication Data

US 2013/0242779 A1    Sep. 19, 2013

Related U.S. Application Data

(60) Provisional application No. 61/607,994, filed on Mar. 7, 2012.

(51) Int. Cl.
 *H04W 24/02* (2009.01)
 *H04L 1/08* (2006.01)
 *H04L 1/18* (2006.01)
 *H04B 7/06* (2006.01)
 *H04L 1/00* (2006.01)
 *H04L 1/06* (2006.01)
 *H04J 11/00* (2006.01)

(52) U.S. Cl.
 CPC .................. *H04W 24/02* (2013.01); *H04L 1/08* (2013.01); *H04L 1/18* (2013.01); *H04B 7/0671* (2013.01); *H04L 1/0009* (2013.01); *H04L 1/06* (2013.01); *H04J 11/0023* (2013.01); *H04J 11/0053* (2013.01)

(58) Field of Classification Search
 CPC ...................................... H04W 24/02
 USPC ......................................... 370/252
 See application file for complete search history.

(56) References Cited

U.S. PATENT DOCUMENTS

2010/0075703 A1\*  3/2010  Imai et al. ................. 455/501
2011/0066911 A1   3/2011  Yoshimoto et al.

FOREIGN PATENT DOCUMENTS

EP      2066063     6/2009
EP      2109243     10/2009
(Continued)

OTHER PUBLICATIONS

PCT Application No. PCT/US2013/029695—International Search Report and Written Opinion dated Jan. 9, 2014.
(Continued)

*Primary Examiner* — Melvin Marcelo
(74) *Attorney, Agent, or Firm* — Downey Brand LLP

(57) ABSTRACT

Methods and apparatus for interference coordination to improve transmission and reception performance within wireless networks. In one exemplary embodiment, a wireless transmitter transmits multiple transmissions over a determined time. The receiver receives the multiple transmissions and attempts to recover the transmitted signal. Because, the fading channel varies over time for each transmitter-receiver, by combining the received signals over multiple iterations, the signal of interest will be magnified, whereas interference effects will be suppressed.

20 Claims, 12 Drawing Sheets

(56) References Cited

FOREIGN PATENT DOCUMENTS

| | | |
|---|---|---|
| EP | 2278739 | 1/2011 |
| WO | WO0052873 | 9/2000 |

OTHER PUBLICATIONS

Taiwanese Patent Application No. 102108123—Office Action dated Nov. 18, 2014.

* cited by examiner

METHODS AND APPARATUS FOR INTERFERENCE COORDINATED TRANSMISSION AND RECEPTION IN WIRELESS NETWORKS

PRIORITY

This application claims priority to co-owned and U.S. Provisional Patent Application Ser. No. 61/607,994 filed Mar. 7, 2012 and entitled "METHODS AND APPARATUS FOR INTERFERENCE COORDINATED TRANSMISSION AND RECEPTION IN WIRELESS NETWORKS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of wireless communication, and data networks. More particularly, in one exemplary embodiment methods and apparatus for interference coordination to improve transmission and reception performance within wireless networks are disclosed.

2. Description of Related Technology

Within telecommunications, data is transmitted wirelessly over radio frequency. The radio link performance is limited by the amount of noise and interference. Noise generally relates to an error or undesired random disturbance of the data signal. Noise can be introduced by natural (e.g., thermal noise) and/or man-made sources (e.g., emitted energy). However, noise is typically distinguished from interference (e.g. cross-talk, unwanted leakage from nearby transmitters, etc.), which is the addition of an unwanted signal to the data signal. Both noise and interference degrade the performance of radio links; however, certain qualities of interference can be exploited to reduce its effects.

Some techniques for interference reduction are based on avoiding interfering situations (e.g., time division multiple access (TDMA), frequency division multiple access (FDMA), code division multiple access (CDMA), orthogonal frequency division multiple access (OFDMA), etc.). Unfortunately, multiple access schemes are generally inefficient in terms of throughput per resource because resources cannot be "reused" between users.

Other techniques reduce the interference level such that it can be treated as background noise; for example, at overlapping cell boundaries, only one cell is allowed to transmit with high power, while the other cell(s) are restricted to lower power. Unfortunately, interference reduction techniques impose transmit power constraints which can reduce throughput per user.

Still other techniques amplify interference such that it can be detected and removed. Successive interference cancellation is one typical example of an interference amplifying scheme. Drawbacks for successive interference cancellation include e.g., increased decoding complexity, and error propagation.

Hence, improved methods and apparatus are needed to improve transmission and/or reception performance in wireless systems.

SUMMARY

The present disclosure provides, inter cilia, apparatus and methods for interference coordination to improve transmission and reception performance within wireless networks.

A method for interference coordination is disclosed. In one exemplary embodiment, the method includes receiving a first number of transmissions; recovering an original signal, the recovering including additively combining the first number of received transmissions. In one variant, the first number of received transmissions includes at least the original signal and one or more interfering signals.

A mobile apparatus is disclosed. In one exemplary embodiment, the mobile apparatus includes a receiver; a processor in signal communication with the receiver; and logic configured to: receive a first number of transmissions; and additively combine the first number of received transmissions. The first number of received transmissions includes at least an original signal and one or more interferences.

A wireless system is disclosed. In one embodiment, the system includes at least one base station and at least one wireless mobile device. The base station and wireless mobile device are further configured to reduce interference by additively combining multiple transmissions.

A computer readable apparatus is disclosed. In one embodiment, the apparatus includes a storage medium having a computer program disposed thereon, the program configured to, when executed, receive a first number of transmissions; and additively combine the first number of received transmissions. In one variant, the first number of received transmissions includes at least an original signal and one or more interferences.

A base station apparatus is disclosed. In one exemplary embodiment, the base station apparatus includes a receiver; a processor in signal communication with the receiver; and logic configured to: receive a first number of transmissions; and additively combine the first number of received transmissions. The first number of received transmissions includes e.g., at least an original signal and one or more interferences.

A method for operating a wireless system is disclosed. A method for interference coordination is disclosed. In one embodiment, the method includes: receiving a first number of transmissions; and recovering an original signal, the recovering including additively combining the first number of received transmissions; wherein the first number of received transmissions includes at least the original signal and one or more interfering signals.

In one variant, the act of recovering the original further includes applying a signal shaping process to the received first number of transmissions. In some cases, the signal shaping process includes applying complex scalar values to the received first number of transmissions. In other scenarios, the signal shaping process includes applying a pseudo-random number (PN) to the received first number of transmissions.

In another variant, the method also includes: determining a reception performance characteristic during the act of receiving; comparing the reception performance characteristic against a predetermined threshold; and when the reception performance characteristic exceeds the predetermined threshold, ceasing the act of receiving of a remainder of the first number of transmissions.

A mobile apparatus configured to remove interference from a received signal is disclosed. In one embodiment, the mobile apparatus includes: a receiver; a processor in data communication with the receiver; and logic in data communication with the receiver and the processor. In one exemplary embodiment, the logic is configured to: receive a first number of transmissions; additively combine the first number of received transmissions; and wherein the first number of received transmissions includes at least an original signal and one or more interferences.

In one variant, the logic is further configured to restore the original signal from the additively combined first number of received transmissions. In some cases, the logic may also: determine an indication of a channel quality associated with a portion of received transmissions of the first number of transmissions; compare the determined indication against a threshold level; and stop further reception of a remaining portion of non-received first number of transmissions when the determined indication is in excess of the threshold level.

In some variants, the logic is further configured to apply a signal shaping process to the first number of received transmissions.

A non-transitory computer-readable storage medium is disclosed. In one embodiment, the non-transitory computer-readable storage medium includes instructions which are configured to, when executed by a processor: receive a plurality of retransmissions of an original signal; combine two or more of the received plurality of transmissions to form an additive signal; and restore the original signal using at least a portion of the additive signal.

A method for operating a wireless system is disclosed. In one embodiment, the method includes: transmitting a signal to a mobile device a determined number of times; wherein the act of transmitting the signal is useful to improve reception of the signal at the mobile device.

In some cases, the determined number of times is dynamically adjusted based at least in part on available resources in the wireless system.

In other variants, the determined number of times is dynamically adjusted based at least in part on one or more measured signal quality characteristics.

In still other cases, the one or more signals to be transmitted are shaped using at least one shaping factor in at least a number of the determined number of times of transmission.

A base station apparatus is disclosed. In one embodiment, the base station includes: a processor; one or more wireless interfaces in data communication with the processor; logic in data communication with the processor and the one or more wireless interfaces. In one exemplary embodiment, the logic is configured to: determine a number of times for a signal to be transmitted repeatedly to a mobile device; and transmit the signal the determined number of times; wherein the transmission of the signal the determined number of times is configured to improve reception performance of the signal at the mobile device.

In one variant, the logic is further configured to determine the number of times based on available resource capacity of the base station.

In other variants, the logic is further configured to apply a sequence to at least a partial number of the signals to be transmitted the determined number of times.

In some variants, the logic is further configured to: determine reception characteristics associated at least in part with the mobile device; wherein a modulation scheme used to transmit at least a number of times the signals is to be transmitted of the determined number of times is based at least in part on the determined reception characteristic.

In some variants, at least a portion of the determined number of signal transmissions are modified using one or more one shaping factors.

A non-transitory computer-readable storage medium is disclosed. In one embodiment, the non-transitory computer-readable storage medium includes instructions which are configured to, when executed by a processor: evaluate a number of times for a specific signal to be transmitted to a mobile device; and transmit the specific signal the evaluated number of times.

Other features and advantages of the present disclosure will immediately be recognized by persons of ordinary skill in the art with reference to the attached drawings and detailed description of exemplary embodiments as given below.

All Figures© Copyright 2012-2013 Apple Inc. All rights reserved.

DETAILED DESCRIPTION

Reference is now made to the drawings, wherein like numerals refer to like parts throughout.

Overview

Improved solutions for interference management are disclosed. Consider an exemplary wireless network that is limited by interference caused by multiple transmitter-pairs that are communicating concurrently. Fading channels vary over time for each transmitter-receiver pair, and the interfering transmissions. Thus, in one disclosed embodiment, the foregoing issues are addressed by each transmitter-receiver pair transmitting multiple times. During each transmission, the transmitter-receiver pair will receive the net signal, which includes both the signal of interest and the interfering signals. By combining multiple transmissions, the original signal is amplified; however, the interfering signals will be suppressed since the fading conditions for the interferers do not additively combine (fading conditions are sufficiently independent and distinct for each of the multiple transmissions).

Various other embodiments may further enhance interference suppression. For example, in one exemplary embodiment, the receiver is configured to perform signal shaping to improve performance. In other embodiments, the transmitter-receiver pair includes a multi-antenna system.

In still other embodiments, the transmitter-receiver pair may further include early termination schemes (e.g., Hybrid Automatic Repeat Request (HARQ)). Additionally, higher orders of processing complexity may be added, such as successive interference cancellation, etc.

DESCRIPTION OF EXEMPLARY EMBODIMENTS

Exemplary embodiments are now described in detail. While these embodiments are primarily discussed in the context of cellular networks including without limitation, third generation (3G) Universal Mobile Telecommunications System (UMTS) wireless networks, Long Term Evolution (LTE) wireless networks and other fourth generation (4G) or LTE-Advanced (LTE-A) wireless networks, it will be recognized by those of ordinary skill that the disclosure is not so limited. In fact, the various principles disclosed herein are useful in and readily adapted to any wireless network that can benefit from interference coordination to improve transmission and reception performance within wireless networks, as described herein.

Interference

Figure 1:
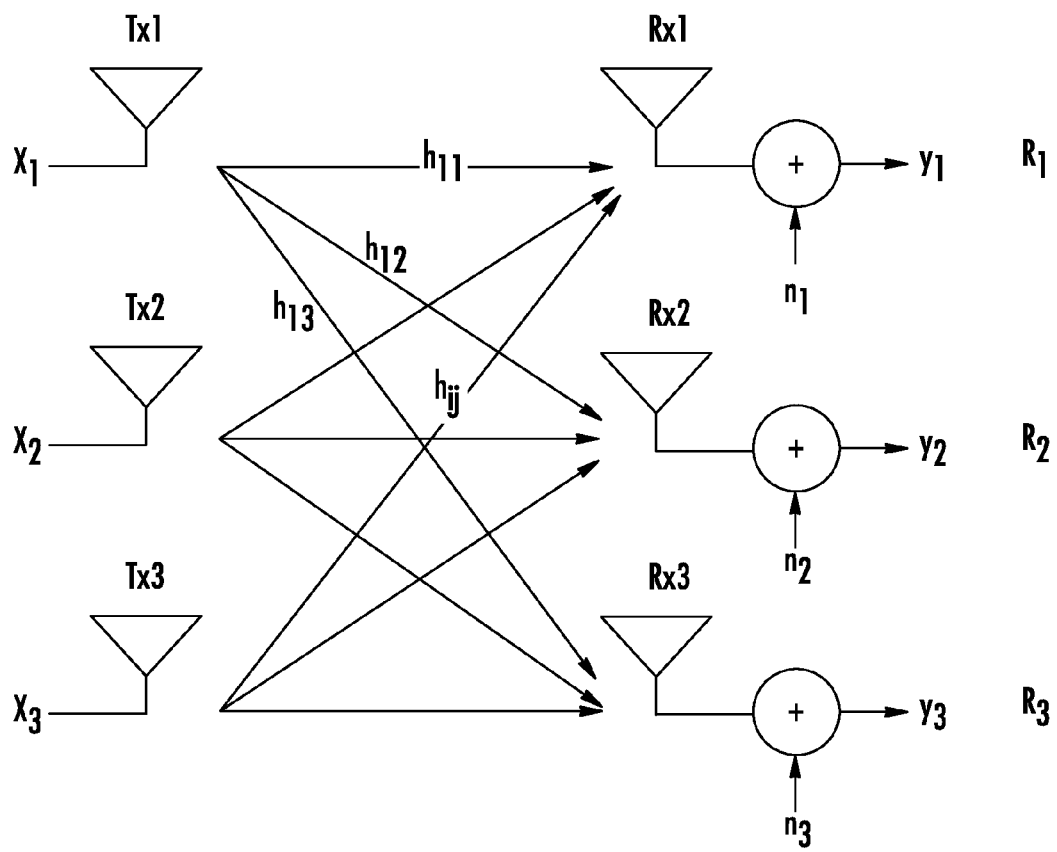
FIG. 1 is a logical block diagram of one wireless network useful for describing various embodiments herein.

Referring now to FIG. 1, one wireless network is illustrated, useful for describing various embodiments herein. As shown in FIG. 1, three (3) transmitters (TX1, TX2, TX3) are shown in communication with three (3) receivers (RX1, RX2, RX3). For simplicity, TX1 is communicating with RX1, TX2 is communicating with RX2, and TX3 is communicating with RX3. Each transmitter has an input data stream (X1, X2, X3), which is transmitted over a channel to its target receiver. For clarity, the transmission channel effects are expressed as a matrix H, where each element of H corresponds to the path metrics between the corresponding transmitter, and corresponding receiver (e.g., $h_{11}$ corresponds to the path metric between the TX1 and RX1). Each receiver receives signaling that has been modified by corresponding path metrics and unintentionally introduced noise ($n_1$, $n_2$, $n_3$), which results in a received signal ($y_1$, $y_2$, $y_3$) having a rate ($R_1$, $R_2$, $R_3$). As shown, each resulting received signal has significant components which are contributed by interference. Within the context of the wireless network of FIG. 1, each user's reception rate R is limited by the amount of interference received from other users (e.g., cross channel effects ($h_{ij}$, where i≠j)) and noise.

In one exemplary embodiment, the wireless network includes a cell of a cellular network. For instance, in one such scenario, the transmitters are one or more base stations and the receivers are one or more user equipment devices (UEs). It is further appreciated that the converse is equally applicable (e.g., where the UEs are the transmitters, and the base stations are receivers). Common examples of transceivers include, without limitation, macrocells (e.g., Node B (NB), evolved Node B (eNB), etc.), microcells, femtocells, picocells, remote radio heads (RRH), relay stations, user equipment (UE), mobile devices, access points (e.g., APs), etc.

Figure 2:
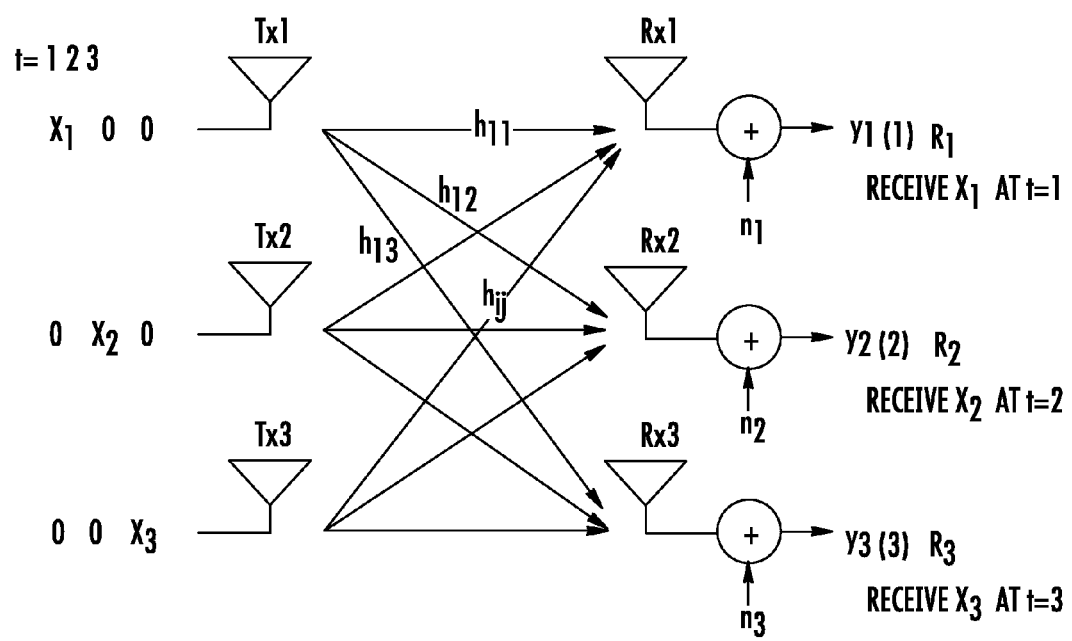
FIG. 2 is a logical block diagram of a prior art multiple access wireless network that provides substantially interference-free communication.

Referring now to FIG. 2, a prior art multiple access wireless network is illustrated that provides substantially interference-free communication. As shown, each user is allocated a non-overlapping time slot. While interference free communication is highly desirable, the time division multiple access (TDMA) scheme of FIG. 2 underutilizes spectral resources. Additionally, it is further appreciated by artisans of ordinary skill that the TDMA scheme of FIG. 2 is purely illustrative; analogous schemes for FDMA, CDMA and OFDMA provide generally equivalent performance (for equivalent bandwidth, radio conditions, etc.).

In contrast to the multiple access wireless network of FIG. 2, some networks overlap user resources and attempt to cancel the resulting interference. In such systems, receivers treat interference as background noise; however, interference is non-negligible and can affect performance dramatically. Alternately, receivers may attempt to cancel interference, unfortunately interference cancellation is not possible if the interference is not strong enough to be recognized (decoded).

Methods

Accordingly, in one exemplary embodiment, each signal is re-transmitted over time and/or frequency among interfering users. By receiving and jointly processing multiple samples of the same transmitted signals over different channel realizations in each re-transmission slot (i.e., both the signal of interest and the interfering signals), the receiver can improve its Signal to Interference plus Noise Ratio (SINR) by boosting its received signal power and suppressing interference. Moreover, it is further noted that performance typically has an optimal retransmission number; i.e., the benefits of increasing SINR through coordinated re-transmission are eventually outweighed by the loss of reduced bandwidth.

Various embodiments are now described in greater detail herein. For example, in one variant, coordinated retransmissions may be further "shaped" (modified according to a cell-specific/user-specific pseudo-random number (PN) sequence).

In other variants, coordinated retransmissions can be performed for various antenna configurations e.g., Multiple Input Multiple Output (MIMO), Single Input Multiple Output (SIMO), Multiple Input Single Output (MISO), Single Input Single Output (SISO).

In yet other variants, coordinated retransmissions may be further combined with early termination based Hybrid Automatic Repeat Request (HARQ).

Still other variants may pause operation during high interference, and/or perform successive interference cancellation (e.g., via minimum mean square error (MMSE), etc.).

Other schemes and variations on the foregoing will be recognized by artisans of ordinary skill, given the contents of the present disclosure.

Figure 3:
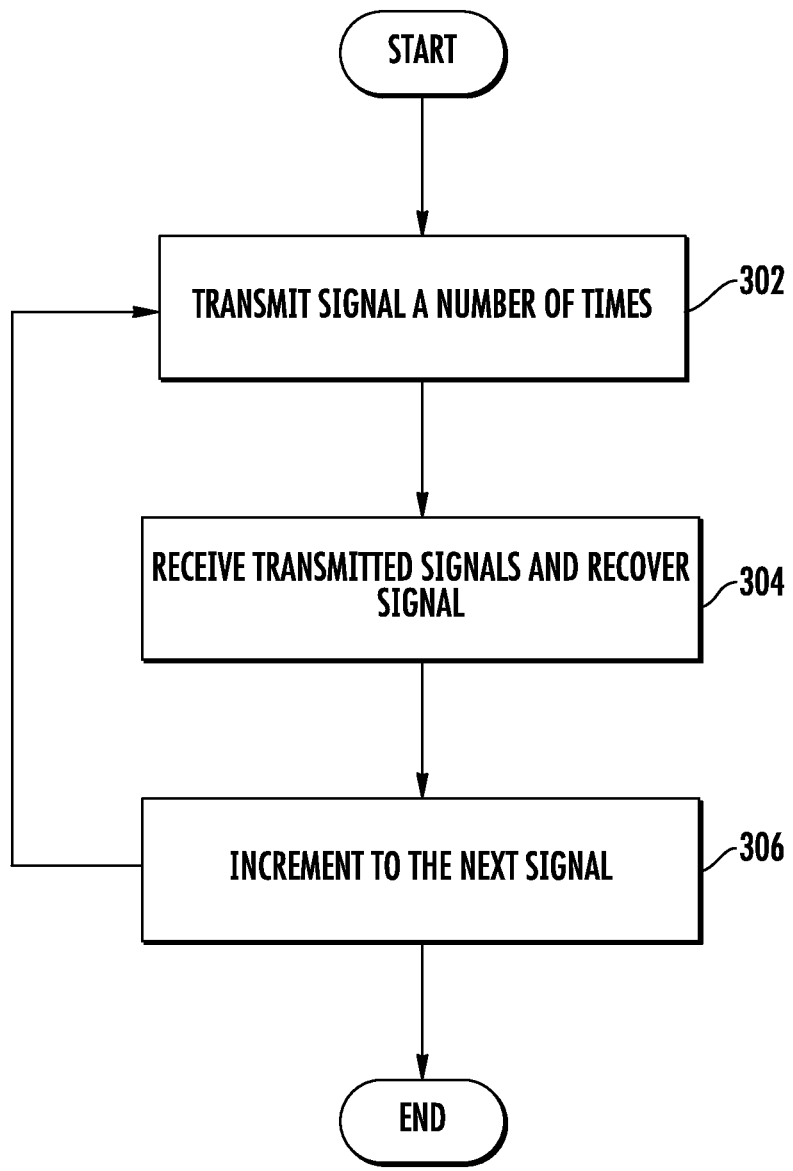
FIG. 3 is a logical flow diagram of a generalized method for interference coordination, in accordance with various disclosed embodiments.

FIG. 3 illustrates one embodiment of a generalized method 300 for interference coordination to improve transmission and reception performance within wireless networks. For the purposes of clarity and concision, the exemplary notation described within APPENDIX A is used throughout.

The wireless network generally includes a first number of transmitters communicating with a second number of receivers. In one exemplary embodiment, the wireless network is a cellular network. Common examples of cellular networks include, without limitation, Global System for Mobile Communications (GSM), Universal Mobile Telecommunications System (UMTS), Long Term Evolution (LTE), LTE-Advanced (LTE-A), Time Division LTE (TD-LTE), Code Division Multiple Access 2000 (CDMA 2000), Time Division Synchronous CDMA (TD-SCDMA), etc. In alternate embodiments, the wireless network is an ad hoc, or peer-to-peer based wireless network. Examples of such networks include, without limitation, Wireless Local Area Networks (WLAN) such as Wi-Fi, Worldwide Interoperability for Microwave Access (WIMAX), etc.

In one variant, each transmitter of the aforementioned network is in direct communication with a corresponding receiver, and each transmitter additively interferes with the other receivers which it is not in communication with. The channel state information for the transmitters and receivers are described with a channel matrix H.

Referring now to step 302 of the method 300, each transmitter transmits a signal (such as a packet, symbol, etc.) a determined number of times sequentially. In one exemplary embodiment, the transmitter is a base station, or alternately the transmitter is a client device. In one such variant with multiple transmitters, the transmitters are further synchronized.

Each transmitter of the exemplary embodiment transmits the same signal a plurality of times. Alternately, each transmitter may transmit a modified version of the same signal. For example, each transmission may include a "shaped" signal, where the shaping includes a multiplication of the signal with a cell-specific/user-specific pseudo-random number (PN) sequence.

The determined number of transmission times may be static or alternatively dynamic. Static embodiments may be determined based on well known parameters such as e.g., device type, data type, required performance, usage scenarios, etc. In some cases, static operation can be pre-determined based on simulation results, empirical data, network and/or user configuration, etc.

Dynamic embodiments may adjust the number of transmissions so as to optimize network performance, etc. Increasing the number of retransmissions increases the SINR of the data transmission; however, increasing the number of retransmissions also reduces the available bandwidth. Thus, in one exemplary embodiment, the transmitters may employ a rules engine (or other optimization process or logic) which balances or selectively chooses the number of transmissions with the consumed bandwidth, so as to maximize overall performance.

Moreover, it is further appreciated that different coding and decoding schemes may provide more (or alternately less) robustness and/or consume more (or alternately less) bandwidth. Thus, variants may further dynamically determine an appropriate number of transmissions based on e.g., various coding and decoding schemes. Such examples are described in greater detail hereinafter (see Example Operation).

In one implementation, the transmissions are performed sequentially on a periodic basis (such as according to a fixed schedule). Alternately, the transmissions may be performed in an aperiodic manner (e.g., according to a dynamically determined schedule). For example, certain cellular technologies (such as LTE) employ flexible scheduling capabilities (e.g., a device may be allocated different numbers of resources over time, according to a transmitted schedule). In still other schemes, the device may be triggered to receive signaling by e.g., a preamble, mid-amble, etc.

In one such embodiment, if a transmitter will impart excessive interference on other receivers, the transceiver may intentionally skip transmission at that time. The other transmitter-receiver pairs, and its own corresponding receiver, will adjust their behaviors accordingly.

In one implementation, each of the transmitters is further "time-aligned". Specifically, each of the transmitters is configured such that their transmissions will occur in lockstep, or according to some other temporal pattern.

At step 304 of the method 300, each receiver receives the transmitted signals and attempts to recover the transmitted signal. In one exemplary embodiment, the transmitted signals for all of the multiple transmissions are collected and jointly processed. The multiple transmissions are redundant, and the fading channel entries are expected to be time varying and independent. Thus, each receiver can combine and jointly process the received signals over multiple iterations such that the signal of interest is magnified, whereas interference effects are suppressed.

Various embodiments may further enhance interference suppression. For example in one exemplary embodiment, the transmitter and receiver are configured to perform signal shaping to improve performance. In one such variant, each transmitted signal is multiplied by a complex scalar. At the receiver, the complex scalars used at the transmitters are incorporated during the receiver combining process. The scalar for each transmitted signal can be optimized such that after the receiver combining, the resulting SINR is improved compared to the case where there is no signal shaping. In order to reduce the complexity of finding the complex scalar for signal shaping, the shaping at the transmitted side can be limited to discrete phases. In another such variant, each transmitter-receiver pair is uniquely assigned a pseudo-random number sequence (PN). The PN sequence (which typically consists of a pattern of unity gain and inverting unity gain) is applied to the signal (in the in-phase and quadrature components of the signal) at the transmitter. During each reception, the received signal of interest is multiplied by the appropriate PN sequence to recover the original signal. Similarly, the PN-multiplied interference is received and recovered. In this manner, the receiver can incorporate PN sequences of its transmitter as well as those of interfering transmitters in its receiver combining process to improve SINR performance.

Moreover, whereas the foregoing has been discussed primarily in terms of a single antenna transmitter and a single antenna receiver, various principles described herein are equally applicable to multiple antenna systems. Existing multi-antenna systems are classified as one of: Multiple Input Multiple Output (MIMO), Single Input Multiple Output (SIMO), Multiple Input Single Output (MISO), Single Input Single Output (SISO). Multiple transmit antennas can be used to provide transmit beam-forming/shaping capability. Multiple receive antennas can be used to provide multiple realizations of the received signal, thus providing better receiver performance (i.e., interference and noise will affect each of the antennas differently, thus when combined the effects of interference and noise will be suppressed).

It is further appreciated that while the foregoing scheme is based on the receiver receiving multiple transmissions, it is appreciated that a transmitter can stop retransmitting if their receiver has sufficient performance. In one variant, receiver performance is measured based on an acceptable threshold (e.g., of SINR, SNR, etc.). Alternately, the receiver performance may be based on explicit signaling, such as e.g., Hybrid Automatic Repeat Request (HARQ) Acknowledgment (ACK) or Non-Acknowledgment (NACK).

In one such embodiment, if all receivers have decoded their packets successfully before the determined number of transmissions, the transmitters may increment to the next packet, symbol, etc. Alternatively, if only a subset of the receivers have decoded their packets successfully before the determined number of transmissions, then the successful transmitter-receiver pairs may cease subsequent transmissions to reduce the interference for the unsuccessful transmitter-receiver pairs. Early incrementing embodiments and transmission ceasing embodiments can be implemented based on acknowledgment (ACK) signaling between the transmitter-receiver pairs. In more complex embodiments, the transmitter additionally examines ACK signaling from the interfering transmitter-receiver pairs.

In one exemplary embodiment, a threshold performance is determined according to required service parameters (e.g., a maximum allowable Bit Error Rate (BER) corresponding to a minimum SINR). In alternate embodiments, the threshold may be based on e.g., fairness constraints for each of the receivers. In still other incarnations, the threshold may be based on other considerations such as e.g., power consumption, decoding complexity, etc.

In still other embodiments, the receiver may employ yet other detection and/or decoding schemes if the level of interference remains high. Common examples of other advanced schemes include, for example, successive interference cancelation, etc.

Returning again to the method of FIG. 3, at step 306, if the transmitter-receiver pairs have successfully received the original signal, then the process increments to the next signal (return to step 302). Alternately, the process may terminate.

Example Operation

Figure 4:
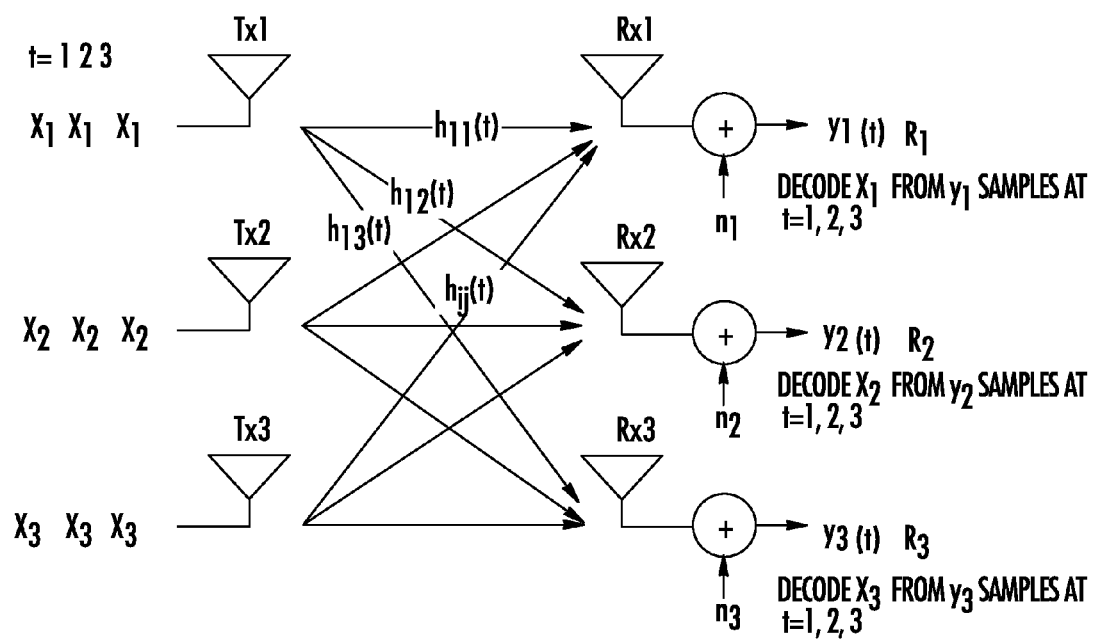
FIG. 4 is a logical block diagram of one exemplary system for interference coordination, in accordance with various disclosed embodiments.

FIG. 4 illustrates one exemplary system 400 for interference coordination to improve transmission and reception performance within wireless networks in accordance with various described embodiments. As shown, three (3) transmitters (TX1, TX2, TX3) are shown in communication with three (3) receivers (RX1, RX2, RX3). For simplicity, TX1 is communicating with RX1, TX2 is communicating with RX2, and TX3 is communicating with RX3. Each transmitter has an input data stream (X1, X2, X3), which is transmitted over a channel to its target receiver. Reference is now made to APPENDIX A, which provides the notation and description of system model used hereinafter.

Figure 5:
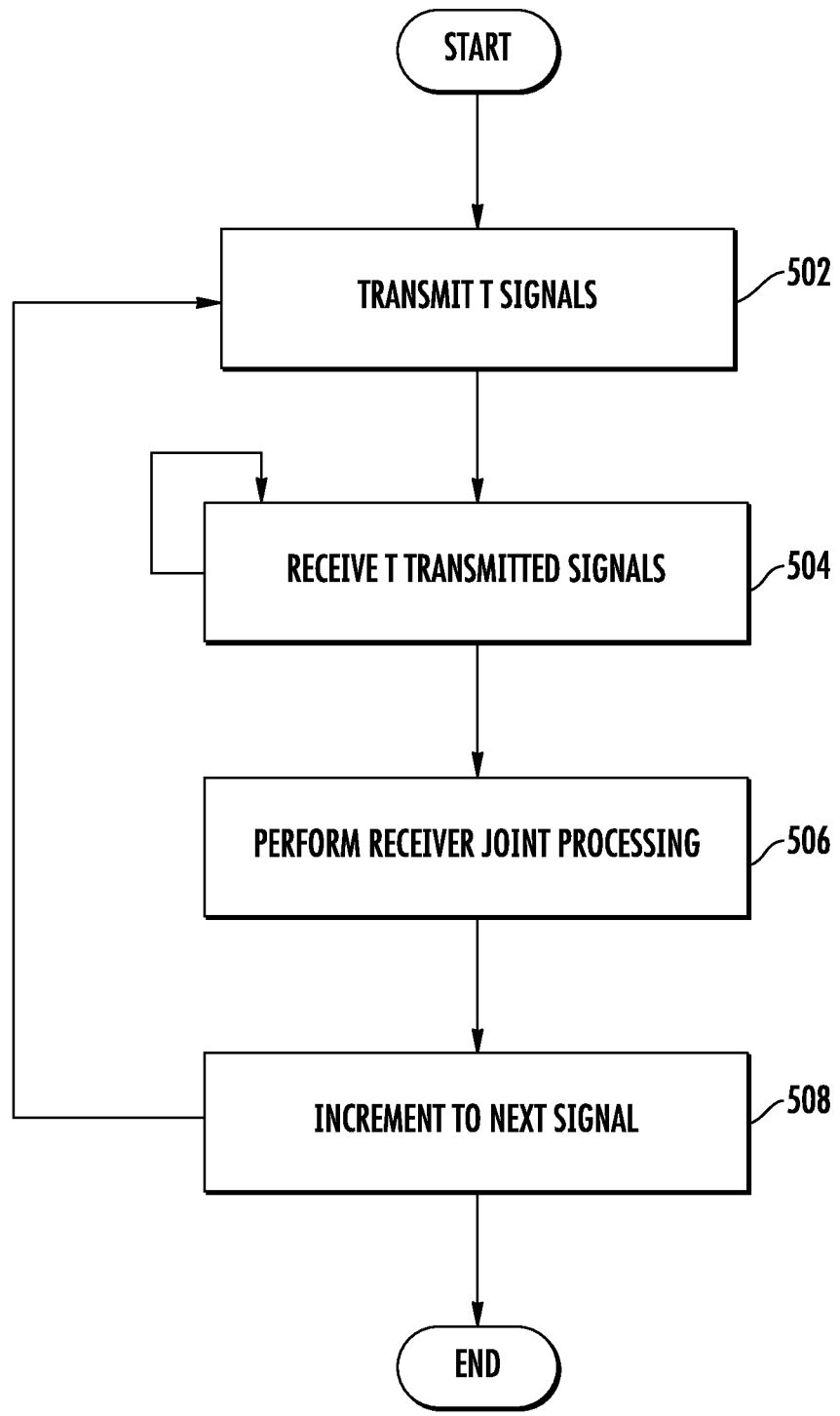
FIG. 5 is a logical block diagram of one exemplary method for interference coordination, according to the various disclosed embodiments.

Referring now to FIG. 5, one exemplary method 500 for interference coordination to improve transmission and reception performance within wireless networks according to the various disclosed embodiments is presented.

At step 502 of the method 500, the transmissions are synchronized across all transmitters, and transmitted a predetermined number of times (T).

At step 504, the transmissions are received at the receivers. The resulting received signals are described according to EQN. 1 (where i is the receiver index):

$$y_i = [y_i(t)]_{t=1}^T = h_{ii}x_i + \sum_{j \ne i} h_{ij}x_j + n_i,$$ EQN. 1

$$h_{ij} = [h_{ij}(t)]_{t=1}^T, n_i = [n_i(t)]_{t=1}^T$$

At step 506, the receivers calculate a resulting performance, based on joint processing. In one exemplary embodiment, the resulting performance is given according to EQN. 2 (see also APPENDIX A):

$$SINR_i = \frac{P_i|S_i h_{ii}|^2}{\sum_{j \ne i} P_j|S_i h_{ij}|^2 + \sigma^2\|S_i\|^2}$$ EQN. 2

Where:

$$S_i = P_i h_{ii}^H \left( \sum_j P_j h_{ij} h_{ij}^H + \sigma^2 I \right)^{-1}$$

At step 508, once the receiver has correctly decoded the transmissions, the transmitter-receiver pair can increment to the next transmission.

Figure 6:
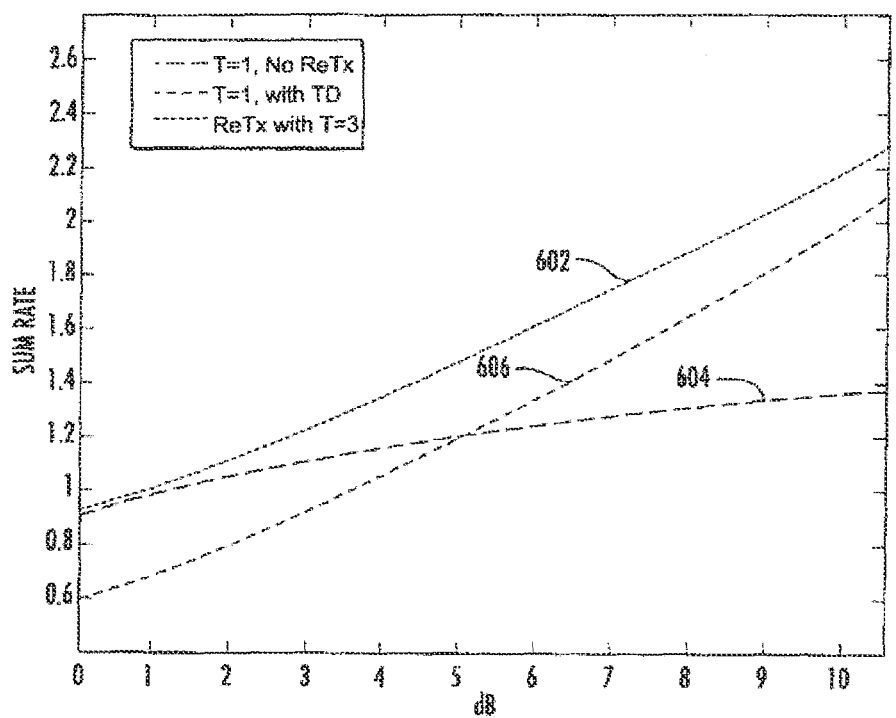
FIG. 6 is a graphical representation of the relative performance of the exemplary system of FIGS. 4 and 5, as compared to prior art systems.

FIG. 6 illustrates the relative performance of the exemplary system (including three (3) transmitter-receiver pairs) as compared to prior art embodiments which do not employ the various features disclosed herein. The expected throughput is given by EQN. 3:

$$SumRate = \frac{1}{T} E\left[\sum_i \log_2(1 + SINR_i)\right]$$ EQN. 3

Specifically, the performance curve having three (3) transmissions 602 is shown in reference to a single transmission (i.e., no retransmission) with interference 604, and a single transmission with time division (i.e., no interference) 606.

Figure 7:
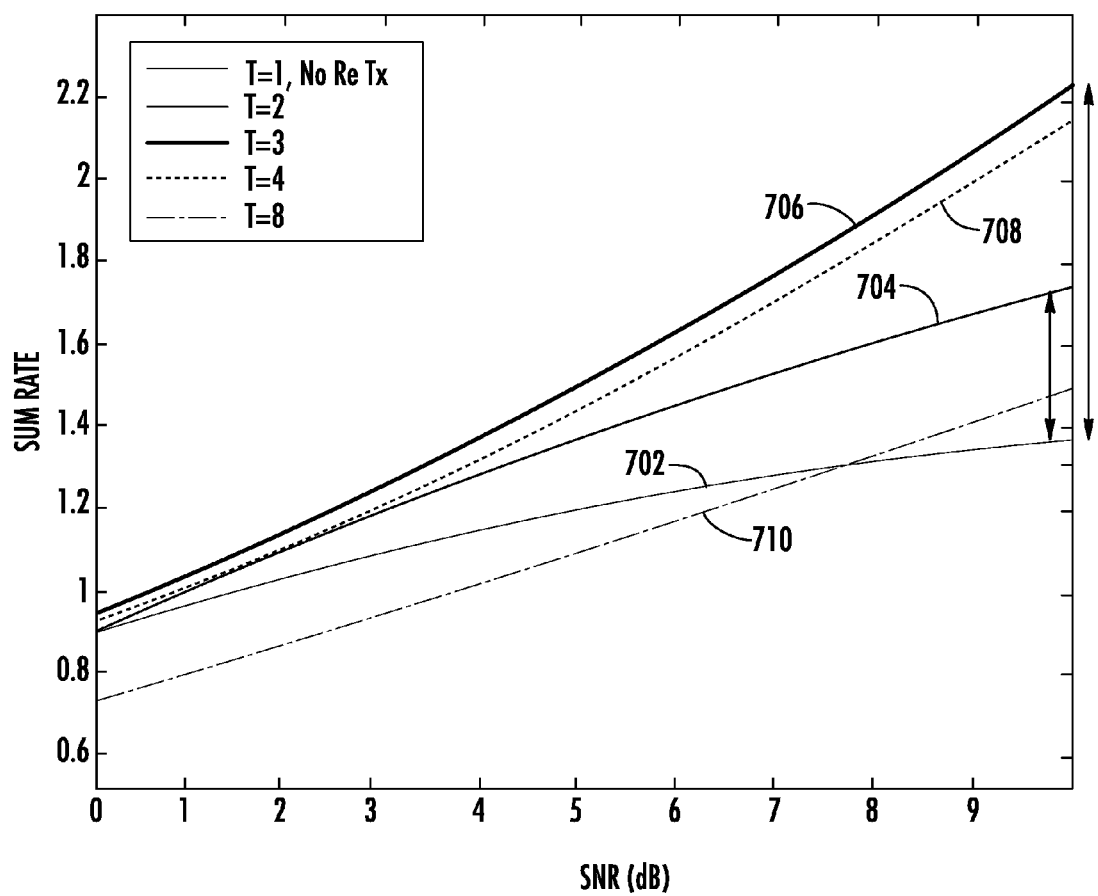
FIG. 7 is a graphical representation of the relative performance of embodiments of the exemplary system of FIGS. 4 and 5 that implement different transmission schemes.

FIG. 7 illustrates the tradeoff in performance based on the number of transmissions used. As shown, there is approximately a 30% increase in throughput between a single transmission 702, and a dual transmission (2) 704. The performance peaks at approximately a 60% performance gain for three (3) 706 and four (4) transmissions 708. However, at eight (8) transmissions 710 there is significantly lower performance than other schemes (i.e., the cost of the retransmissions outweighs the benefits of improved reception).

Figure 8:
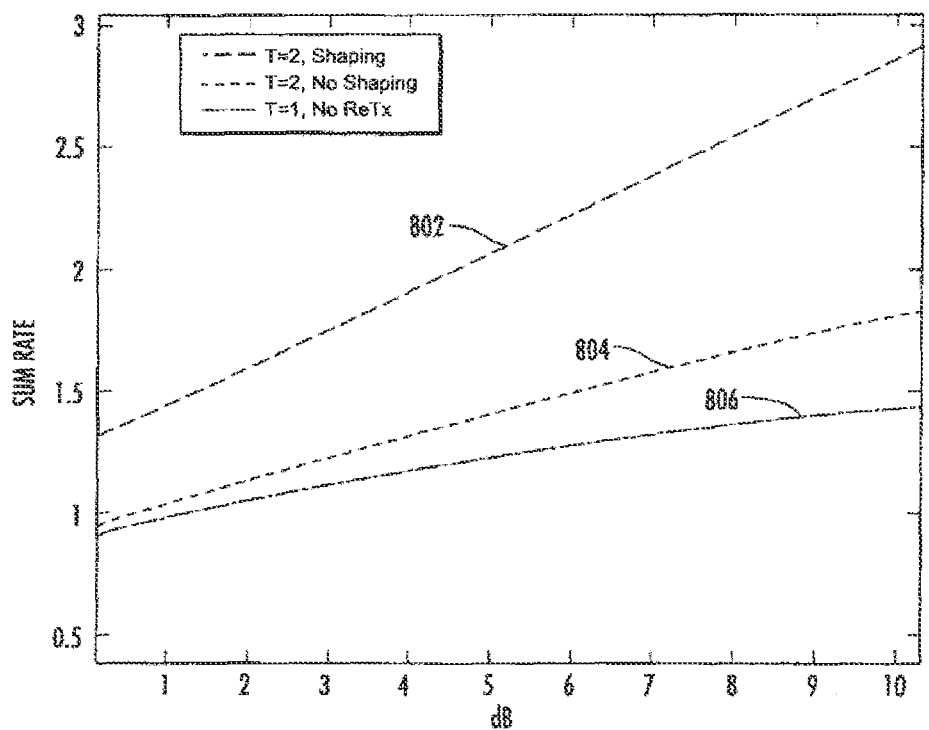
FIG. 8 is a graphical representation of the relative performance of signal shaping on the exemplary system of FIGS. 4 and 5.

FIG. 8 illustrates the relative performance impact of signal shaping on various disclosed embodiments. Consider a shaping scheme for a dual transmission case (2), where during the first transmission, the signal is transmitted unshaped. During the second transmission the signal is "shaped" by multiplying the signal by a shaping factor. The shaping factor is determined based on channel state information (CSI) (such as fading channel coefficients and noise power available at the receiver) to maximize the resulting SINR. Maximizing SINR results in higher sum rates at the receiver. In this manner, multiplication at the transmitters and combining at the receiver can be configured such that the transmitted signal from each transmitter is amplified at the desired receiver and suppressed at the other receivers. The resulting performance is given according to EQNS. 4, 5A, 5B, 5C, 6:

$$y_i = \begin{bmatrix} y_i(1) \\ y_i(2) \end{bmatrix} = \Theta_{ii}x_i + \sum_{j \ne i} \Theta_{ij}x_j + n_i$$ EQN. 4

Where:

$$\Theta_{ij} = \begin{bmatrix} h_{ij}(1) \\ \alpha_j h_{ij}(2) \end{bmatrix}$$ EQN. 5A $$x_i(1) = x_i$$ EQN. 5B
$$x_i(2) = \alpha_i x_i$$

-continued $$n_i = \begin{bmatrix} n_i(1) \\ n_i(2) \end{bmatrix} \quad \text{EQN. 5C}$$

Then:

$$\hat{x}_i = P_i \Theta_{ii}^H \left( \sum_j P_j \Theta_{ij} \Theta_{ij}^H + \sigma^2 I \right)^{-1} y_i \quad \text{EQN. 6}$$

As shown in FIG. 8, pre-shaping performance for a dual transmission scheme 802 is significantly better (35%) than a dual transmission without pre-shaping 804. A single transmission is also shown for reference 806.

Figure 9:
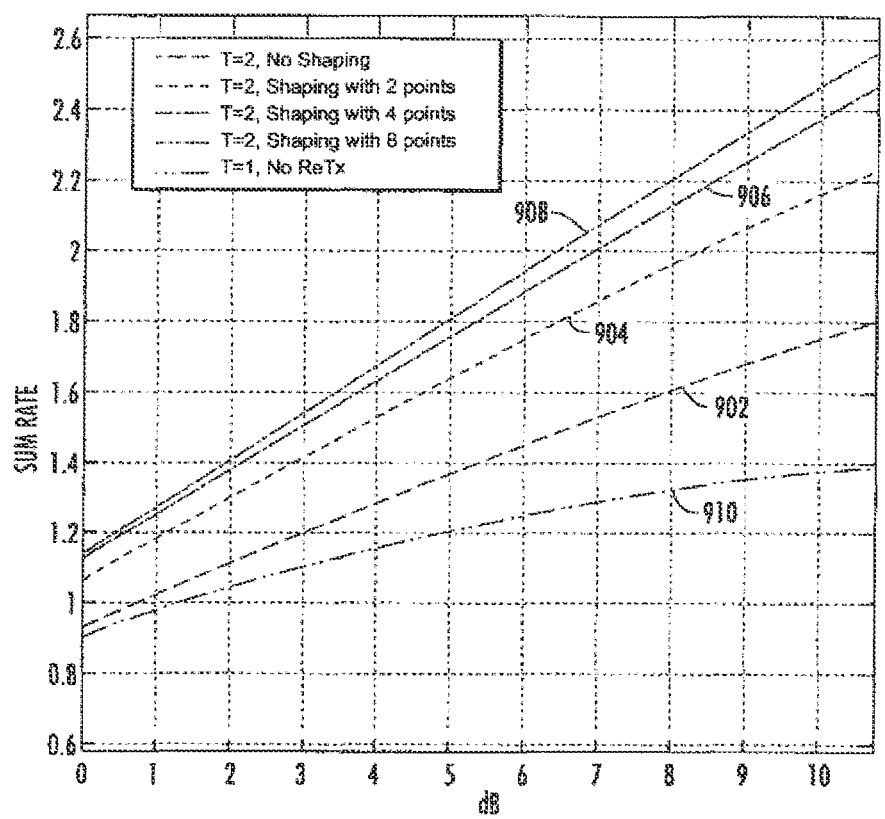
FIG. 9 is a graphical representation of the relative performance of discrete signal shaping on the exemplary system of FIGS. 4 and 5.

In one such variant, the shaping performance can be simplified while still retaining significant benefits. As shown in FIG. 9, the shaping can be limited to discrete phase shifts within the set of EQN. 7:

$$\left\{ 0, \frac{\pi}{m}, \ldots, \frac{(m-1)\pi}{m} \right\} \quad \text{EQN. 7}$$

As shown in FIG. 9, performance data for (i) a dual transmission scheme without shaping 902, (ii) a dual transmission scheme with two discrete phases 904, (iii) a dual transmission scheme with four discrete phases 906, and (iv) a dual transmission scheme with eight discrete phases 908, are shown. A single transmission is also shown for reference 910.

Hybrid Automatic Repeat Request (HARQ) Operation

Figure 10:
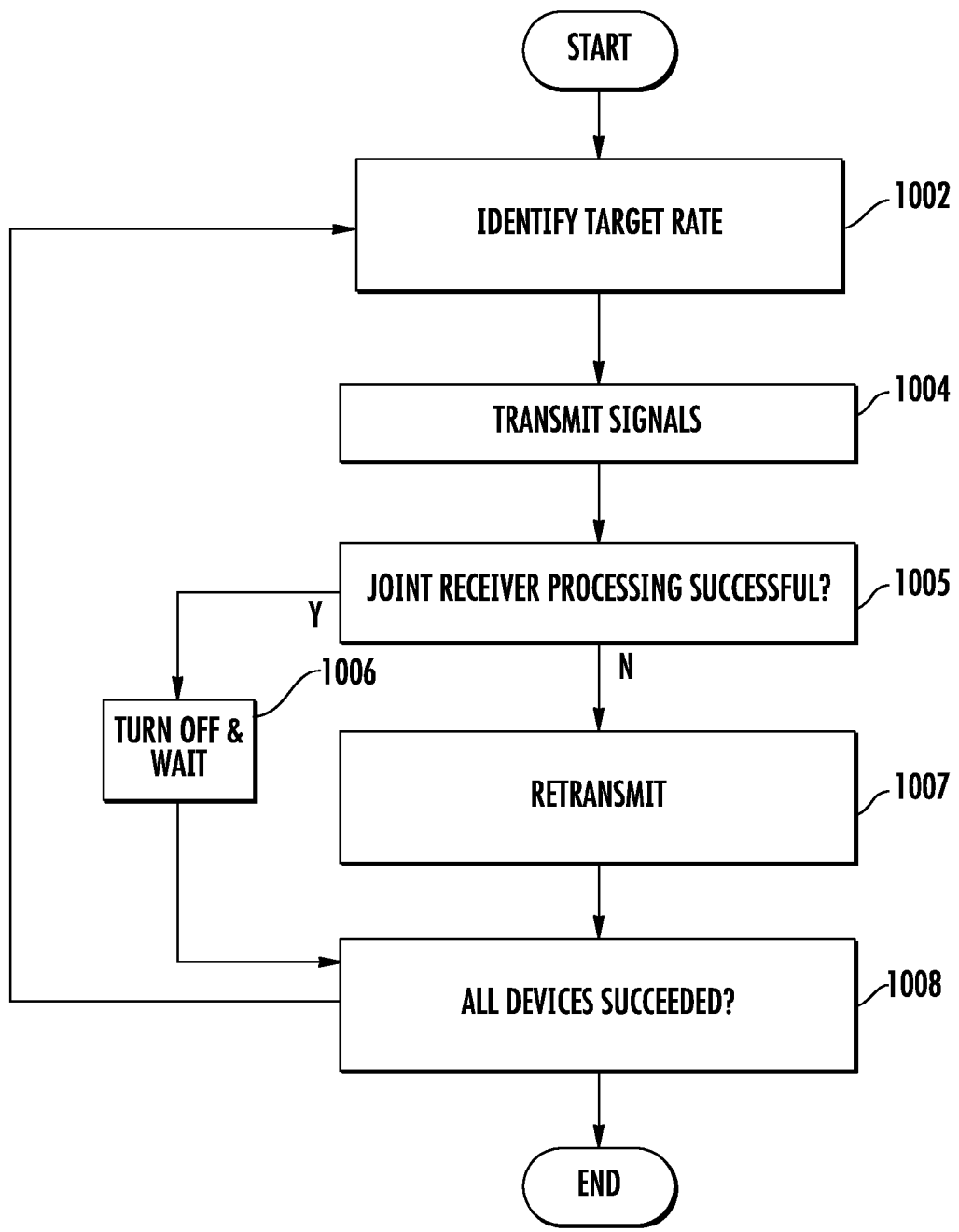
FIG. 10 is a logical flow diagram of one exemplary method for Hybrid Automatic Repeat Request (HARQ) assisted interference coordination.

In another exemplary embodiment, performance may be further improved with the addition of HARQ type operation. As shown in FIG. 10, one exemplary method 1000 for HARQ assisted interference coordination is presented.

At step 1002, a target rate to SINR ($R_{target}$/SINR$_{target}$) ratio is identified for each transmitter-receiver pair. In one such embodiment, the target SINR is equivalent to SNR$^\alpha$; in this example, $\alpha$ is a value between −3 and 3 and SNR is the average Signal to Noise Ratio, which does not include interference effects.

At step 1004, the transmissions are synchronized across all transmitters, and transmitted to the receivers up to a predetermined maximum number of times (T), which in this example is four (4).

At step 1005, the receiver performs joint receiver processing based on all the received transmissions (all previous transmissions up to the current transmission). if the receiver successfully successively decodes the transmissions (i.e., the SINR reaches SINR$_{target}$ for the received packet) before all T iterations (4), then the transmitter turns off until the next data packet is ready to be sent (step 1006).

If the number of transmissions of the same packet has not exceeded the predetermined number of times (T) and all the devices have not succeeded, a synchronized retransmission is performed and the accumulated SINR$_{target}$ is checked again (step 1007).

If all receivers have successfully decoded their packets (exceeded their SINR$_{target}$), then the transmitters can initiate a new round of transmissions (step 1008).

The resulting performance of the method 1000 of FIG. 10 is provided by EQN. 8 (where j is the receiver index, K is the number of receivers, and I{ ... } is an indicator function):

$$\text{Throughput} = E \left[ \frac{\sum_{l=1}^{\infty} \sum_{i=1}^{K} I\{SINR_i^{(l)} \geq SINR_{target,i}\} \times R_{target,i}}{\sum_{l=1}^{\infty} \min\{T, \max\{t_i^{(l)}\}\}} \right]$$

Figure 11:
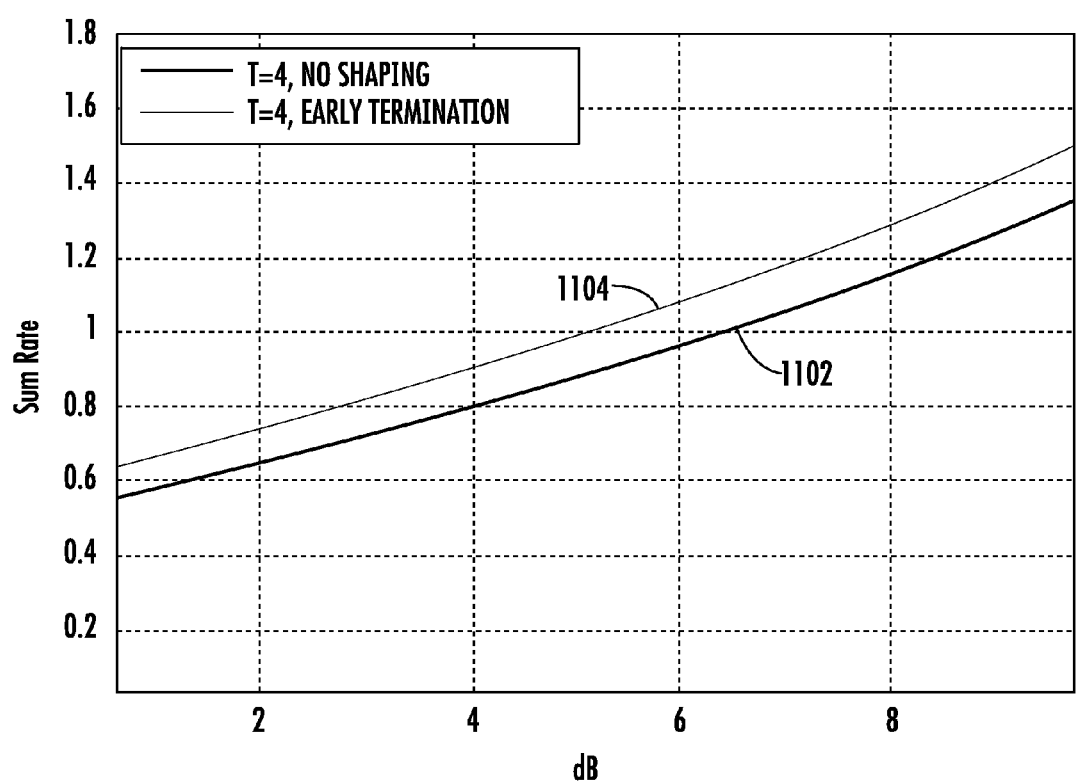
FIG. 11 is a graphical representation of the relative performance of a transmission scheme (of FIGS. 4 and 5) without Hybrid Automatic Repeat Request (HARQ), and the transmission scheme with HARQ.

FIG. 11 is a graphical representation of exemplary performance data obtained according to the method of FIG. 10. As shown, a transmission scheme without HARQ 1102, and transmission scheme with HARQ 1104 are illustrated.

Apparatus

Figure 12:
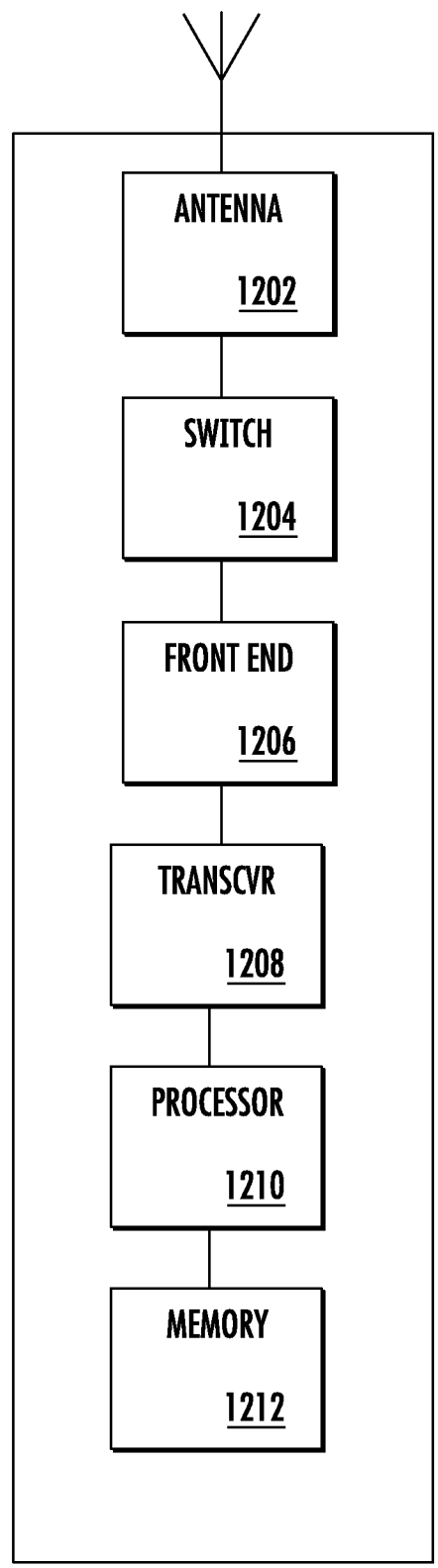
FIG. 12 is a logical block diagram of an exemplary transceiver device.

Referring now to FIG. 12, an exemplary transceiver device 1200 for interference coordination to improve transmission and reception performance within wireless networks is illustrated.

As used herein, the term "transceiver device" includes, but is not limited to cellular telephones, smartphones (such as for example an iPhone™), wireless-enabled tablet devices (such as for example an iPad™), or any combinations of the foregoing. Moreover other embodiments may include e.g., base stations, peer-to-peer wireless networking devices, wireless servers, wireless access points (e.g., APs), etc.

While one specific device configuration and layout is shown and discussed herein, it is recognized that many other configurations may be readily implemented by one of ordinary skill given the present disclosure, the apparatus 1200 of FIG. 12 being merely illustrative of the broader principles described herein.

The apparatus 1200 of FIG. 12 includes one or more radio antennas 1202, a RF switch 1204, a RF front end 1206, a transceiver 1208, a processor 1210 and a computer readable memory 1212.

The baseband processing subsystem 1210 includes one or more of central processing units (CPU) or digital processors, such as a microprocessor, digital signal processor, field-programmable gate array, RISC core, or plurality of processing components mounted on one or more substrates. The baseband processing subsystem is coupled to computer readable memory 1212, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown processing subsystem 1210 includes discrete components; however, it is understood that in some embodiments they may be consolidated or fashioned in a SoC (system-on-chip) configuration.

The processing subsystem 1210 is adapted to receive and/or transmit one or more data streams from the RF assembly (e.g., radio antenna 1202, RF switch 1204, RF front end 1206, and radio transceiver 1208). In one embodiment, the processing subsystem 1210 is further configured to jointly combine a received plurality of a signal in order to magnify a desired received signal to mitigate effects of sources of signal interference.

In another embodiment, the processing subsystem 1210 is further configured to determine a number of times to repeat transmission of a signal to a mobile device. In one implementation, the processing subsystem is further configured to apply a signal shaping process on one or more repeated transmissions, where the signal shaping process is configured to further mitigate the effect of signal interference of the transmitted signal.

The RF assembly is configured for operation with a wireless standard, such as e.g., the Long Term Evolution (LTE) standard. The RF assembly is furthermore configured for operation via a single antenna, or via a multiple antenna diversity scheme.

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles described herein.

APPENDIX A

© Copyright 2012-2013 Apple Inc. All Rights Reserved

As used herein for a wireless network having K receivers serviced by L transmitters, the channel matrix at time slot t is described according to the channel matrix H(t), where:

$$H(t) = \begin{bmatrix} h_{11}(t) & h_{12}(t) & \ldots & h_{1K}(t) \\ h_{21}(t) & h_{22}(t) & \ldots & h_{2K}(t) \\ \vdots & \vdots & \vdots & \vdots \\ h_{K1}(t) & \ldots & h_{KK-1}(t) & h_{KK}(t) \end{bmatrix}$$

Within this context, the received signal is the sum of: (i) the desired signal multiplied by its path characteristic, (ii) the sum of the interferences (undesired signals multiplied by their corresponding path characteristics), and (iii) the noise. This relationship can be expressed according to EQN. 9:

$$\underbrace{y_i(t)}_{\text{Received Signal}} = h_{ii}(t) \underbrace{x_i(t)}_{\text{Desired Signal}} + \underbrace{\sum_{j \neq i} h_{ij}(t) x_j(t)}_{\text{Interference}} + n_i(t) \quad \text{EQN. 9}$$

Consider a transmission power $P_i$, a radio environment with Additive White Gaussian Noise (AWGN) having a variance $\sigma^2$ where the path characteristics are independent and identically distributed (iid), and where each symbol/packet is transmitted T times by synchronized transmitters. The resulting received signal is expressed according to EQN. 10:

$$y_i = [y_i(t)]_{t=1}^T = h_{ii} x_i + \sum_{j \neq i} h_{ij} x_j + n_i, \quad \text{EQN. 10}$$

$$h_{ij} = [h_{ij}(t)]_{t=1}^T, \ n_i = [n_i(t)]_{t=1}^T$$

Using a Minimum Mean Square Error (MMSE) estimation to perform signal recovery, the resulting Signal to Interference plus Noise Ratio (SINR) is described according to EQN. 11:

$$SINR_i = \frac{P_i |S_i h_{ii}|^2}{\sum_{j \neq i} P_j |S_i h_{ij}|^2 + \sigma^2 \|S_i\|^2} \quad \text{EQN. 11}$$

Where:

$$S_i = P_i h_{ii}^H \left( \sum_j P_j h_{ij} h_{ij}^H + \sigma^2 I \right)^{-1} \quad \text{EQN. 12}$$

What is claimed is:

1. A method of interference management at a wireless device that includes a plurality of receive antennas, the method comprising:
    at the wireless device:
        receiving a plurality of receive signals through a receive antenna of the plurality of receive antennas, the plurality of receive signals corresponding to a set of up to a pre-determined number of redundant transmissions of a transmit signal sent from a transmit antenna of a plurality of transmit antennas, wherein at least one transmission in the set of redundant transmissions of the transmit signal is shaped by a shaping factor, and wherein the plurality of receive signals include interference signals corresponding to simultaneous transmissions from other transmit antennas in the plurality of transmit antennas; and
        decoding the transmit signal by jointly processing the plurality of receive signals using the shaping factor.

2. The method as recited in claim 1 further comprising:
    at the wireless device:
        determining a signal to interference plus noise ratio (SINR) based on the plurality of receive signals; and
        notifying a transmitter that includes the transmit antenna to stop redundant transmissions of the transmit signal when the SINR satisfies a target SINR threshold and the set of redundant transmissions includes fewer than the pre-determined number of redundant transmissions.

3. The method as recited in claim 1, wherein at least one transmission in the set of redundant transmissions is not shaped by the shaping factor.

4. The method as recited in claim 2, wherein the wireless device notifies the transmitter to stop redundant transmissions of the transmit signal by using a hybrid automatic repeat request (HARQ) procedure.

5. The method as recited in claim 1, further comprising:
    at the wireless device:
        notifying the transmitter to stop redundant transmissions of the transmit signal when a performance metric for the receive antenna satisfies a performance threshold.

6. The method as recited in claim 5, wherein the performance threshold is based on one or more service parameters comprising a fairness constraint, power consumption, and a decoding complexity.

7. The method as recited in claim 5, wherein the wireless device notifies the transmitter to stop redundant transmissions of the transmit signal by using a HARQ procedure.

8. The method as recited in claim 1, wherein the shaping factor is based on channel state information (CSI) including fading channel coefficients and noise power determined by the wireless device.

9. The method as recited in claim 1, wherein the shaping factor comprises a complex scalar comprising one or more discrete phases.

10. The method as recited in claim 1, wherein the shaping factor comprises a pseudo-random number (PN) sequence including a pattern of unity gain and inverting unity gain that is applied to in-phase and quadrature components of the transmit signal.

11. The method as recited in claim 1, wherein the pre-determined number of redundant transmissions is static across multiple transmit signals and is based on one or more of: a device type, a data type, a required performance, or a usage scenario.

12. The method as recited in claim 1, wherein the pre-determined number of redundant transmissions is dynamically adjusted across multiple transmit signals based on optimization of a network performance metric.

13. A wireless mobile device comprising:
a plurality of receive antennas;
a transceiver configured to receive a plurality of receive signals through a receive antenna of the plurality of receive antennas, the plurality of receive signals corresponding to a set of up to a pre-determined number of redundant transmissions of a transmit signal from a transmit antenna of a plurality of transmit antennas, wherein at least one transmission in the set of redundant transmissions of the transmit signal is shaped by a shaping factor, and wherein the plurality of receive signals include interference signals corresponding to simultaneous transmissions from other transmit antennas in the plurality of transmit antennas; and
a processing subsystem coupled to the transceiver and configured to decode the transmit signal by jointly processing the plurality of receive signals using the shaping factor.

14. The wireless mobile device as recited in claim 13, wherein the processing subsystem is further configured to:
determine a signal to interference plus noise ratio (SINR) based on the plurality of receive signals; and
notify a transmitter that includes the transmit antenna to stop redundant transmissions of the transmit signal when the SINR satisfies a target SINR threshold and the set of redundant transmissions includes fewer than the pre-determined number of redundant transmissions.

15. A non-transitory machine-readable medium storing instructions that, when executed by one or more processors in a wireless device, cause the wireless device to at least perform the actions of:
receiving a plurality of receive signals through a receive antenna of a plurality of receive antennas, the plurality of receive signals corresponding to a set of up to a pre-determined number of redundant transmissions of a transmit signal from a transmit antenna of a plurality of transmit antennas, wherein at least one transmission in the set of redundant transmissions of the transmit signal is shaped by a shaping factor, and wherein the plurality of receive signals include interference signals corresponding to simultaneous transmissions from other transmit antennas in the plurality of transmit antennas; and
decoding the transmit signal by jointly processing the plurality of receive signals using the shaping factor.

16. A method of interference management in a base station apparatus that includes a plurality of transmit antennas, the method comprising:
at the base station apparatus:
transmitting sequentially to a wireless device a set of up to a pre-determined number of redundant transmissions of a transmit signal through a transmit antenna of the plurality of transmit antennas, wherein at least one transmission in the set of redundant transmissions of the transmit signal is shaped by a shaping factor;
simultaneously transmitting to the wireless device through at least one other transmit antenna in the plurality of transmit antennas a second set of redundant transmissions of a second transmit signal; and
stop transmitting the set of redundant transmissions of the transmit signal in response to receiving a notification from the wireless device that indicates successful reception of the transmit signal and fewer than the pre-determined number of redundant transmissions of the transmit signal have been sent to the wireless device.

17. The method as recited in claim 16, wherein the notification from the wireless device indicates successful reception of the transmit signal when a performance metric satisfies a performance threshold at the wireless device.

18. The method as recited in claim 17, wherein the notification from the wireless device comprises a hybrid automatic repeat request (HARQ) message.

19. The method as recited in claim 16, wherein at least one transmission in the set of redundant transmissions of the transmit signal is not shaped by the shaping factor.

20. The method as recited in claim 16, wherein the shaping factor is based on channel state information (CSI) including fading channel coefficients and noise power determined by the wireless device.

* * * * *